United States Patent [19]

Westley

[11] Patent Number: 4,623,809
[45] Date of Patent: Nov. 18, 1986

[54] STEPPER MOTOR HOUSING AND POLE ASSEMBLY

[75] Inventor: Curtis E. Westley, St. Louis Park, Minn.

[73] Assignee: Honeywell Inc., Minneapolis, Minn.

[21] Appl. No.: 590,232

[22] Filed: Mar. 16, 1984

[51] Int. Cl.[4] .................................................. H02K 37/00
[52] U.S. Cl. ................................... 310/49 R; 310/164
[58] Field of Search ........................... 310/49, 162–165, 310/42, 257, 89

[56] References Cited

U.S. PATENT DOCUMENTS 2,430,782 11/1947 Poole ................................ 310/164 X
3,310,698 3/1967 Krell .................................. 310/42 X
4,355,248 10/1982 Manson ............................. 310/49 X Primary Examiner—Donovan F. Duggan
Attorney, Agent, or Firm—Charles L. Rubow

[57] ABSTRACT

A stepper motor housing an pole structure is disclosed in which a pair of identical stator plates, each having a plurality of poles, are positioned back to back with the poles projecting in opposite directions, the stator plates being positioned between a pair of substantially identical stator cups, each stator cup having a plurality of poles projecting inwardly from a back wall with a peripheral side wall terminating in an outwardly extending flange. A major surface of each flange is in contact with a face on one of the stator plates so as to assure a low reluctance magnetic path.

13 Claims, 6 Drawing Figures

STEPPER MOTOR HOUSING AND POLE ASSEMBLY

BACKGROUND OF THE INVENTION

The invention disclosed herein relates generally to permanent magnet motors, and more particularly to a simplified stepper motor housing and pole structure design which assures good magnetic circuit characteristics with a minimum number of simple, easily assembled parts.

Stepper motors are widely used in disc drives, printers, and other computer peripheral equipment, word processing typewriters and actuators for a variety of other applications. Increasingly higher speeds are being required from such equipment, which necessitates greater motor torque. In addition, increasingly precise performance is being required, which necessitates greater motor stepping accuracy. Concurrently, there is a continuing requirement to reduce cost. Thus, it is important to minimize parts count, simplify parts design, reduce possibilities for assembly errors and simplify required tooling and manufacturing steps. Along with the foregoing there are demands for size reduction.

A stepper motor design which has shown potential for improved performance, cost and size characteristics is one in which a permanent magnet rotor is caged within a plurality of poles comprising projections on inner and outer stator members which are stacked together with the outer stator members being cup shaped and serving as a housing for electrical windings. The inner stator members are disc shaped and connected back to back, each with a central opening surrounded by poles projecting in opposite directions. The outer cup shaped members also each have a central opening surrounded by inwardly projecting poles interleaved with the outwardly projecting poles on the inner stator members. An electrical winding is located within each outer stator member outside the poles. A stepper motor of this design is disclosed in U.S. Pat. No. 4,355,248 issued to H. Manson on Oct. 19, 1982.

Motor torque is affected by the characteristics of the magnetic material from which the rotor is made, the number of turns of wire used in the windings and reluctance of the magnetic circuits, which is increased by air gaps and constrictions in magnetic materials in the magnetic flux paths. Higher performance magnetic materials are generally higher in cost, thus requiring a tradeoff between cost and performance. More turns of wire in the windings requires more space, which increases the motor size. With reference to minimizing reluctance of the magnetic circuits and to providing stepping accuracy, both require maintaining high dimensional accuracy during fabrication and rigid positioning of stator elements.

The design disclosed in U.S. Pat. No. 4,355,248 provides improvements in the areas of insuring pole alignment accuracy and providing rigid connections between the inner and outer stator members. This is accomplished by forming the inner stator members and assembling them back to back so that their peripheral edges are slightly separated. The outer cup shaped stator members are sized to fit over the edges of the inner stator members and are staked along the edges at several points around the circumference so as to be deformed into the separation between the inner stator members. A separate mounting flange is attached to one side of one of the outer stator members to serve as means for mounting the motor.

Some disadvantages of this design are in the areas of parts count and simplicity, ease of assembly and magnetic circuit reluctance. In regard to the latter area, a potential location of relatively high magnetic reluctance occurs at the junction of the inner and outer stator members. Each outer stator member contacts an inner stator member only along the edge of the inner member. The outer member is formed by a drawing operation, and, thus, is prone to certain variations and inaccuracies as indicated in the previously identified patent. Accordingly, firm contact between the inner and outer members is assured only at the points at which the outer member is staked. Elsewhere there may be air gaps or limited contact between the members.

The process by which the inner stator members are attached back to back is described as involving welding or a suitable adhesive. During this process the members are apparently maintained in proper alignment by a jig or fixture using alignment holes in the members. Thus, an alignment fixture, welding or bonding equipment and staking equipment are required for motor assembly.

The applicant has avoided the above noted disadvantages by providing a design comprising a minimum number of simple self aligning parts requiring no special assembly equipment. The parts assembly is not subject to critical tolerance areas, and provides firm contact between parts. Thus, low reluctance magnetic paths between parts are assured.

SUMMARY OF THE INVENTION

The present invention is a stepper motor housing and pole structure which basically comprises first and second stator plates, each having a center opening surrounded by a plurality of poles projecting from a first face, the stator plates being positioned in contact so that the poles project in opposite directions. First and second stator cups are positioned on opposite sides of the stator plates, each stator cup having a back wall, a side wall extending from the periphery of the back wall toward the stator plates, and a plurality of poles projecting from the back wall and interleaved with the poles on one of the stator plates. The side wall terminates in a flange along at least a major portion of its length, the flange having a major surface parallel and in contact with the first face of one of the stator plates. The stator plates are self aligning by means of a first locating protrusion on the second face of each of the stator plates which is received in a corresponding aperture in the other plate, and are aligned with the stator cups by means of second locating protrusions on the first faces of the stator plates which mate with corresponding apertures in the flanges on the stator cups in contact therewith. The latter protrusions may be tubular in form so as to accommodate fastners for securing the stator plates and cups together and mounting the stepper motor.

DESCRIPTION OF THE PREFERRED EMBODIMENT

Figure 1:
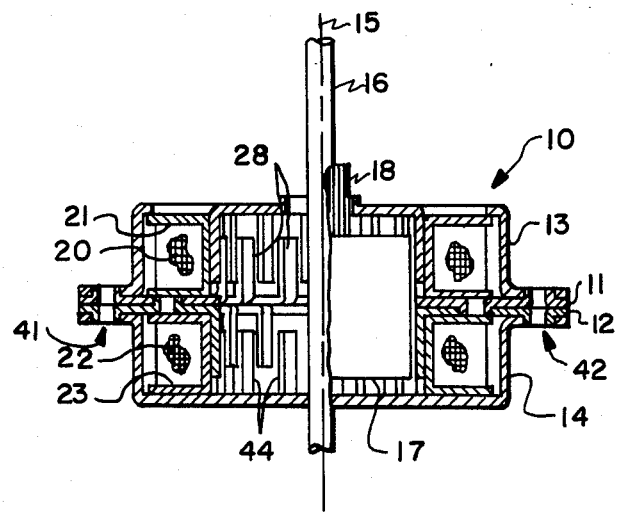
FIG. 1 is a cross sectional view of a stepper motor according to the present invention.

In FIG. 1, reference numeral 10 generally identifies a stepper motor having a housing and pole structure in accordance with the applicant's invention. The housing and pole structure comprises first and second stator plates 11 and 12 and first and second stator cups 13 and 14. As will be described hereinafter, stator plates 11 and 12 each have a generally circular central opening symmetrical about an axis 15 and surrounded by a plurality of poles projecting from a first face, the poles being substantially parallel with axis 15. Similarly, stator cups 13 and 14 each have a circular arrangement of poles around axis 15, the poles being substantially parallel with the axis and interleaved with the poles on an adjacent stator plate.

A shaft 16 extends along axis 15 and carries a rotor 17 shown partly broken away. Rotor 17 comprises a suitable permanently magnetized drum. An output pinion gear 18 is shown connected to rotor 17. Pinion 18 may be coupled to rotor 17 either directly or through a suitable clutch mechanism.

A winding 20 on a bobbin 21 is located within stator cup 13 outside the poles thereon. Similarly, a winding 22 on a bobbin 23 is located within stator cup 14 outside of the poles thereon.

Figure 2:
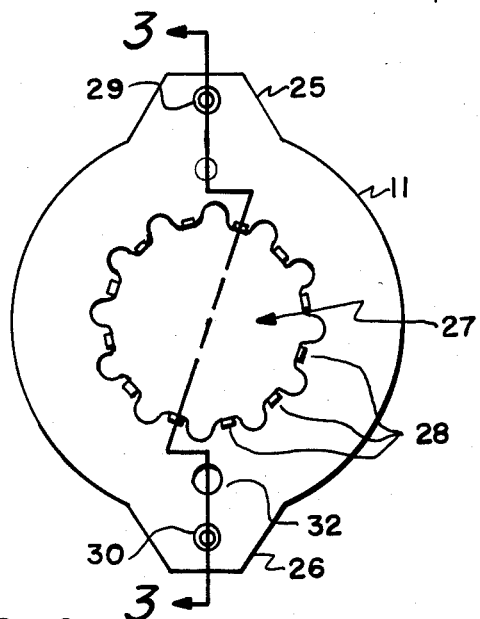
FIG. 2 is a plan view of a stator plate used in the motor of FIG. 1.
Figure 3:
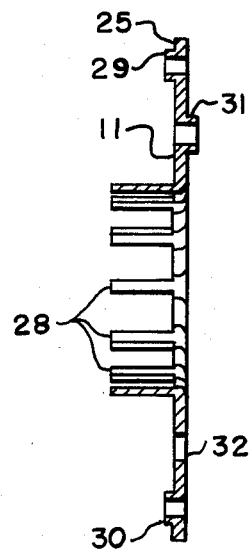
FIG. 3 is a cross sectional view of the stator plate of FIG. 2 taken along lines 3—3.

Stator plates 11 and 12 are identical, and only stator plate 11 will be described in detail. As shown in FIGS. 2 and 3, stator plate 11 basically comprises a disc of magnetic material having opposing outwardly extending ears 25 and 26 on the edge thereof. Reference numeral 27 identifies a central opening in stator plate 11. Opening 27 is generally circular and is surrounded by a plurality of poles 28 projecting from a first face of the plate. The poles may be produced by die cutting the central portion of a blank disc so as to form fingers which are bent away from the plane of the disc. Stator plate 11 is also formed with a pair of hollow protrusions 29 and 30 extending from the first face of the plate, a hollow protrusion 31 extending from a second face of the plate and an aperture 32. Protrusion 31 and aperture 32 are configured and located to mate with a corresponding aperture and protrusion respectively on stator plate 12 when the plates are positioned back to back or with their second surfaces in contact. The mating protrusions and apertures provide means for accurate self alignment of stator plates 11 and 12.

Figure 4:
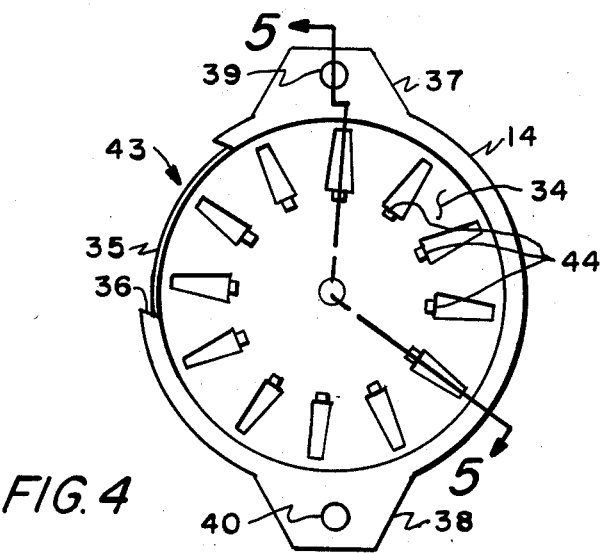
FIG. 4 is a plan view of a stator cup used in the motor of FIG. 1.
Figure 5:
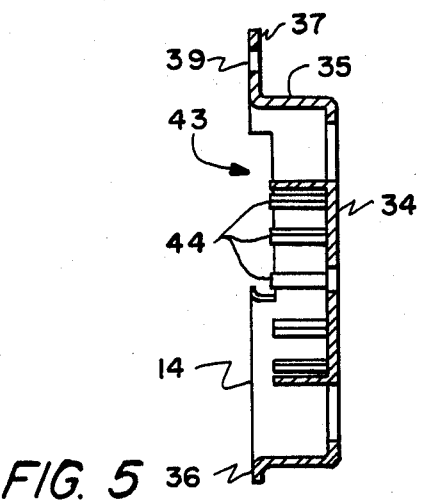
FIG. 5 is a cross sectional view of the stator cup of FIG. 4 taken along lines 5—5.

Stator cup 14 shown in FIGS. 4 and 5 is configured with a back wall 34 and a side wall 35 at the periphery of the back wall extending transversely thereto. Side wall 35 terminates in an outwardly extending flange 36 having a pair of opposing ears 37 and 38 on the edge thereof. Ears 37 and 38 contain a pair of apertures 39 and 40 respectively. The outer edge of flange 36 is generally of the same size and shape as the outer edge of stator plates 11 and 12, and apertures 39 and 40 are sized and located to mate with protrusions such as 29 and 30 on stator plate 11. Thus, these protrusions and apertures serve to accurately self align the stator plates and stator cups.

As shown in FIG. 1, the protrusions on the ears of stator plates 11 and 12 also form mounting holes 41 and 42 for convenient mounting of the stepper motor. Thus, no separate or special mounting plate or means is required. Returning to FIGS. 4 and 5, a slot 43 is provided in the side walls and flanges of the stator cups to accommodate printed circuit board connectors for windings 20 and 22.

Stator cup 14 is formed with a plurality of poles 44 projecting from the inner surface of back wall 34. Poles 44 are arranged and located to be interleaved with poles 28 when the stator cup is positioned as intended adjacent a stator plate. Stator cups 13 and 14 are identical except for central holes in the back walls thereof. The central hole in stator cup 13 is large enough to provide clearance around pinion 18, whereas the central hole in stator cup 14 is substantially the same diameter as shaft 16, which, among other things, serves to properly position rotor 17 and pinion 18. When stator plates 11 and 12 and stator cups 13 and 14 are assembled, each of the poles is at a unique circumferencial location around axis 15 and each pole is equally spaced from adjacent pole locations on either side thereof.

Figure 6:
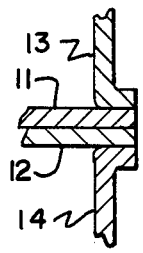
FIG. 6 is an enlarged fragmentary view typical of the junction between parts in the stepper motor of FIG. 1.

As shown in FIG. 6, when stator plates 11 and 12 and stator cups 13 and 14 are assembled, a major surface of the flange on each of the stator cups is in contact with the first face on one of the stator plates. The stator plates and cups can be firmly drawn together by means of fasteners extending through holes 41 and 42. Thus, a low reluctance magnetic junction is simply provided and assured between mating stator plates and stator cups. Air gaps and points of constriction of magnetic material in the junction between stator plates and stator cups are eliminated.

In accordance with the foregoing discussion, the applicant has provided a unique stepper motor housing and pole structure design comprising a minimum number of simple parts which are self aligning and easily assembled and disassembled by means of conventional fasteners. No special alignment fixtures or assembly processes or equipment are required, and the design assures low reluctance magnetic circuits. A specific embodiment has been shown and described for illustrative purposes. However, a variety of modifications and variations within the applicant's contemplation and teaching will be apparent to those of ordinary skill in the relevant arts. It is not intended that coverage be limited to the disclosed embodiment, but only by the terms of the following claims.

The embodiments of the invention in which an exclusive property or right is claimed are defined as follows:

1. A stepper motor comprising:

first and second annular stator plates, each having first and second faces, a central opening and a first plurality of poles surrounding the opening and projecting from the first face, said stator plates being positioned so that the second faces are in contact, whereby the first pluralities of poles project in opposite directions, said stator plates each being formed with a first locating protrusion on the second face thereof which is received by a first aperture in the other of said stator plates; and first and second stator cups, each having a back wall, a peripheral side wall extending transversely from an inner face of the back wall and a second plurality of poles projecting from the inner face and arranged to be interleaved with the poles in one of the first pluralities of poles, the peripheral side wall terminating in an outwardly extending flange along at least a major portion of the length thereof, said first and second stator cups being positioned on opposite sides of said first and second stator plates with the second pluralities of poles projecting toward one another and interleaved with the first pluralities of poles, the flanges on the peripheral walls of said first and second stator cups each having a major surface in contact with the first face on a separate one of said first and second stator plates, the flange on each of said stator cups further having a second aperture therein which receives a tubular second locating protrusion on the first face of the stator plate with which that stator cup is in contact.

2. The stepper motor of claim 1 further including a rotor positioned within the first and second pluralities of poles and supported for rotation about an axis generally parallel with the poles.

3. The stepper motor of claim 1 wherein said first and second stator plates and said first and second stator cups are positioned such that each pole is at a unique circumferential location and each pole is equally spaced from adjacent circumferential pole locations on either side thereof.

4. The stepper motor of claim 3 wherein said first and second stator plates are identical.

5. The stepper motor of claim 4 wherein each of said stator plates is configured with a pair of tubular second locating protrusions on the first face thereof which are received by a pair of second apertures in the flange on the stator cup in contact therewith, whereby fasteners can be inserted through said tubular protrusions to secure said stator plates and stator cups together and to mount the stepper motor.

6. The stepper motor of claim 5 wherein:
the second protrusions are located on opposing ears extending outwardly from the edges of said stator plates; and
the second apertures are located in opposing ears extending outwardly from the edges of the flanges on said stator cups.

7. The stepper motor of claim 6 wherein the poles on said stator cups are formed by inwardly extending fingers cut in the back walls of said stator cups and bent away from the planes of the back walls.

8. The stepper motor of claim 7 further including a rotor positioned within the first and second pluralities of poles and supported for rotation about an axis generally parallel with the poles.

9. A housing and pole piece assembly for a stepper motor having a rotor rotatable about a central axis, said assembly comprising:
first and second stator plates extending substantially perpendicular to the central axis, each having an opening therein for receiving the rotor, the opening being surrounded by a first plurality of poles projecting from a first face thereof, the poles being equally spaced about the central axis and extending substantially parallel therewith, said stator plates having second faces opposite the first faces in contact with one another so that the first pluralities of poles project in opposite directions, each of said stator plates being formed with a first locating protrusion on the second face thereof which mates with a first aperture in the other stator plate; and
first and second stator cups on opposite sides of said stator plates, each stator cup having a back wall with an inner surface transverse to the central axis, a side wall extending from the periphery of the back wall transverse to the inner surface thereof toward said stator plates, and a second plurality of poles projecting from the inner surface substantially parallel with the central axis and interleaved with the first plurality of poles on one of said stator plates, the side wall terminating in a flange along at least a major portion of the length thereof, the flange having a major surface parallel and in contact with the first face of said one of said stator plates, the flange further having a second aperture therein which receives a tubular second locating protrusion on the second face of the stator plate with which that stator cup is in contact.

10. The assembly of claim 9 wherein each of said stator plates is formed with a pair of tubular second locating protrusions on the first face thereof received by a pair of second apertures in the flange on the stator cup in contact therewith to accomodate fasteners for securing said stator plates and stator cups together and for mounting the stepper motor.

11. The assembly of claim 10 wherein:
the first pairs of protrusions and apertures are located on ears extending outwardly from the edges of said stator plates and the flanges on said stator cups.

12. The assembly of claim 11, wherein said first and second stator plates are identical.

13. The assembly of claim 12 wherein each pole is located at a unique circumferential position around the central axis and is equally spaced from adjacent circumferential pole positions on either side thereof.

* * * * *